Jan. 13, 1953 A. L. W. WILLIAMS 2,625,337

WINDING CONTROL DEVICE

Filed Nov. 1, 1947 3 Sheets-Sheet 1

INVENTOR.
A.L.W. WILLIAMS
BY [signature]
ATTORNEY

INVENTOR.
ALFRED L.W. WILLIAMS
BY
Elber J. Hyde
ATTORNEY

Jan. 13, 1953 A. L. W. WILLIAMS 2,625,337

WINDING CONTROL DEVICE

Filed Nov. 1, 1947 3 Sheets-Sheet 3

INVENTOR.
ALFRED L.W. WILLIAMS
BY
Elber J. Hyde
ATTORNEY

Patented Jan. 13, 1953 2,625,337

UNITED STATES PATENT OFFICE 2,625,337

WINDING CONTROL DEVICE

Alfred L. W. Williams, Cleveland Heights, Ohio, assignor to The Brush Development Company, Cleveland, Ohio, a corporation of Ohio Application November 1, 1947, Serial No. 783,587

13 Claims. (Cl. 242—54)

This invention relates to thin magnetic record transducing apparatus and particularly to such apparatus that utilizes as a magnetic recording medium an elongated flexible record track, such as a wire filament or tape, which may be stored on reels and transferred between reels to mechanically link successively elemental portions to a magnetic transducing core for forming a recording or reproducing operation.

Among the objects of the invention are novel magnetic record transducer apparatus of the foregoing type embodying various control features for providing a simple and fool-proof apparatus for safely performing the reeling operations and preventing the subjection of the record track to stresses that might cause it to break.

Further objects of the invention include novel simple magnetic record reeling control structure in which the cessation of the reeling operation is accompanied by a negligible amount of overrun or coasting and at the same time a reversal in reeling direction is rendered impossible until the record track has been brought to a standstill.

The foregoing and other objects of the invention will be best understood from the following description of various exemplifications of the features of the invention, reference being had to the accompanying drawings wherein.

Figure 1:
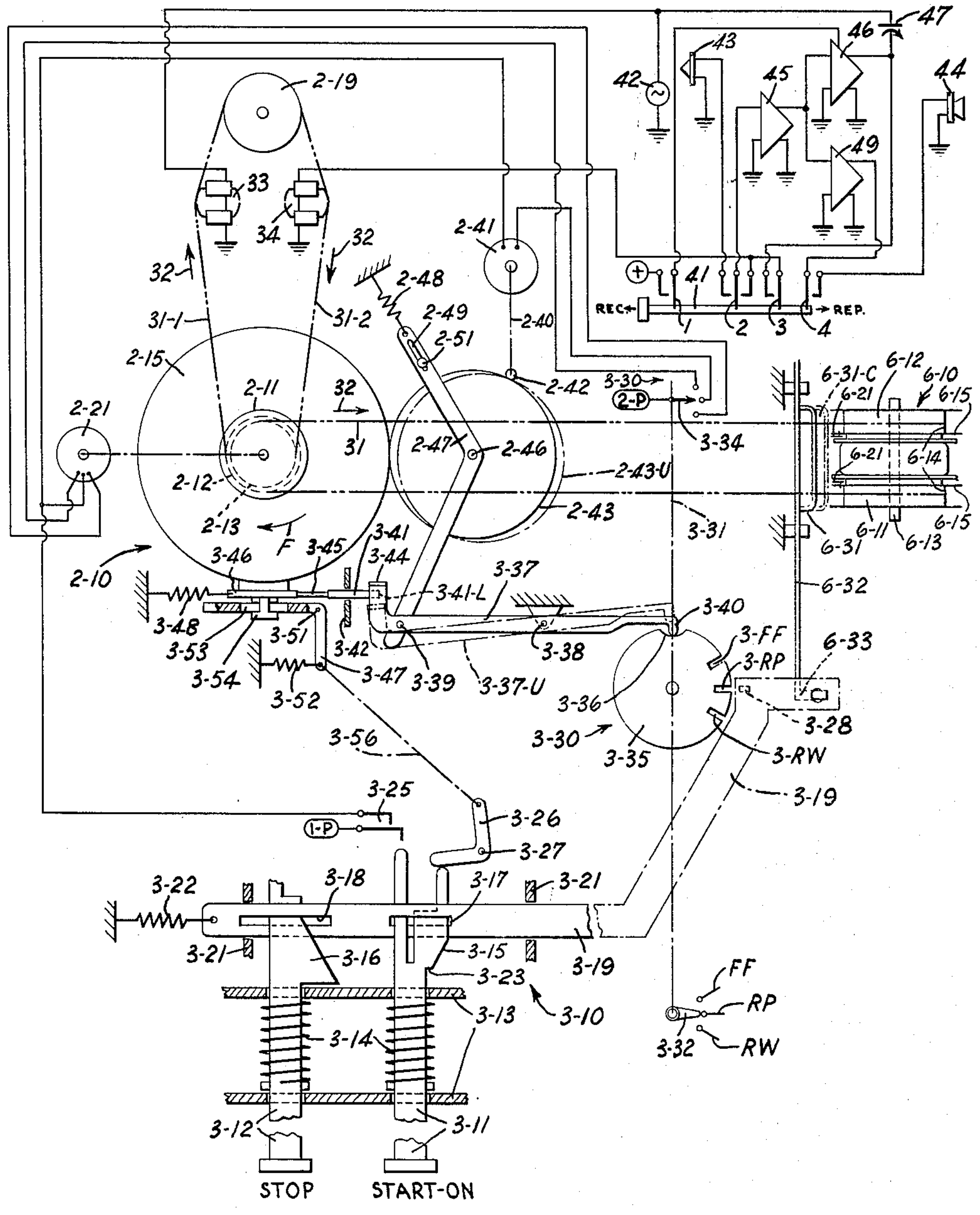
Fig. 1 is a simplified diagrammatic view illustrating the general relationship of the mechanical, magnetic and electric elements of a magnetic recording and reproducing apparatus exemplifying one form of the invention.

Fig. 1 illustrates in a simplified diagrammatic manner the general relationship of the mechanical, magnetic and electric elements of a magnetic recording and reproducing apparatus exemplifying one form of the invention. In general, it comprises a driving mechanism 2—10, a control mechanism 3—10 and a reeling mechanism 6—10 arranged to reel and guide a long flexible magnetic record member 31, such as a filament, wire or tape stored on two reels 6—11, 6—12, along a path indicated by dash-double-dot lines, either in forward direction 32 during a recording or playback operation, or in the opposite rewinding direction for rewinding the recording medium on reel 6—11 before another recording or playback operation. A magnetic erasing head indicated at 33 and a magnetic record transducing head 34 are located along the path of the motion of the record member 31 for either recording magnetic signals on the magnetic recording medium by the operation of the erasing head 33 and the record transducing head 34 or for playing back recorded signals by the operation of the record transducing head 34 as a playback head, while the record member 31 is impelled in the forward direction 32.

To simplify the description of the features of the invention, a slow speed reeling operation in the forward direction of the arrow 32 will be designated as a normal forward reeling operation during which the record medium is reeled from reel 6—11 operating as a supply reel past the erasing head 33 and the transducing head 34 onto reel 6—12 which operates as a take-up reel, the two reels being for convenience designated as the supply and take-up reel although during a rewinding operation, take-up reel 6—12 operates as a supply reel and supply reel 6—11 operates as a take-up reel.

During the magnetic recording process, each element of the record member 31 passes successively first past the pole gap region of the magnetic erasing head 33 and then past the pole gap region of the record transducing head 34 operating as a recording head. The recording system shown in Fig. 1 is arranged to carry on magnetic recording and reproducing or playback operations under the control of a multiblade recording switch 4—41. The recording switch may be a standard multiblade switch which is shown operated manually by a knob from the neutral position shown either to the left for establishing the recording circuit connections or to the right side for establishing playback circuit connections.

When the recording switch 4—41 is in the left-hand recording position, its blades establish the following recording circuit connections: Contact blade 1 connects a source of high frequency oscillations 4—42 to a source of a positive power supply indicated by a plus (+) sign, the oscillation source 4—42 being shown connected to the coils of the erasing head 33 for supplying thereto high frequency erasing current of sufficiently large amplitude so that each longitudinal element of the moving magnetic record member 31 passing the gap region of the erasing head is subjected to an alternating flux strong enough to erase any previous magnetic signal records and restore the magnetic elements of the record member to a magnetically substantially neutral condition. After being subjected to the magnetic erasing action by the erasing head 33, each element of the moving record member 31, upon reaching the pole gap region of the record transducing head 34, is subjected to a magnetic recording flux produced by the amplified signal currents which are to be recorded and a superimposed high frequency biasing flux component.

In Fig. 1, a conventionally shown microphone 4—43 serves as a source of signals which are to be recorded, and a loudspeaker 4—44 serves to reproduce the signals. During the recording operation the microphone is connected by way of contact blade 2 in its left-hand position to the input side of a pre-amplifier 4—45, the output of which, after further amplification by an additional recording amplifier 4—46, is supplied to the coil windings of the record transducing head 34 through switch blade 3 of the recording switch 4—41 in its left-hand position, the circuits being completed through the ground connections shown.

The high frequency bias component of the recording flux is supplied by a high frequency current component derived from the oscillator 4—42 by a suitable circuit, such as shown, which includes an adjustable coupling condenser 4—47 for supplying an adjustable component of the high frequency oscillations to the output circuit of the amplifier 4—46 where it is mixed with the amplified signal currents supplied by the microphone 4—43 which are to be recorded. The coupling condenser 4—47 and the other circuit elements of the system are designed to mix a suitable component of the high frequency oscillations derived from the oscillator 42 with the amplified signal current supplied by the microphone in such manner as to produce in the gap region of the recording head 34 the desired combination of the signal recording flux and the superimposed high frequency biasing flux component.

To play back the signals magnetically recorded on the record member 31 while it moves in the same forward direction indicated by the arrow 32, the selector switch 4—41 is actuated to the right-hand playback position. In the right-hand reproducing or playback position of the recording switch 4—41, its blade 1 disconnects the positive supply source plus (+) from the oscillator 4—42 and the recording amplifier 4—46, thereby rendering them inoperative.

In addition, blade 2 of the selector switch 4—41, in its right-hand position, disconnects the input side of the pre-amplifier 4—45 from the microphone 4—43 and connects instead the windings of the record transducer head 34 to the input side of the amplifier 4—45, the output of which is now impressed on the additional playback amplifier 4—49, the output of which is supplied to the reproducer 4—44 by the switch blade 4 of the recording switch in its right-hand position, switch blade 3 now keeping open the circuit connection of the windings of the transducer head 34 to the recording amplifier 4—46.

The magnetizable record member may take various forms. It may be formed as a relatively thin wire of the order of .004 to .006 inch in diameter. It may, alternatively, take the form of a thin, narrow ribbon such as might be formed, for example, by flattening out such a thin wire. In other types of apparatus to which the principles of this invention are applicable, a relatively wide tape or sheet may be used as the record member. For example, the tape may be a quarter of an inch or more in width, although the apparatus shown herein is designed for a record member consisting of a long thin wire or a wire-like tape. Such thin magnetic record member may also be formed of a filamentary element of a non-magnetic material, for example, a fibrous or plastic thread, in which is disposed a magnetizable powder material, or which is coated with a layer of magnetizable material.

For proper operation of the recording and of the reproducing action, the speed of movement of the record member should be constant as it moves past the record transducing head, by means of which the signals are to be recorded or subsequently to be reproduced. After a desired signal has been recorded upon a magnetic record member, the record may be reproduced by moving the record member at the same speed past the same or a similar transducer head of the same characteristics, that is connected during such reproducing operation, to appropriate amplifying and reproducing circuits.

Normally, the filament or wire record member is disposed in wound condition on a supply spool or reel. During the recording operation the wire is unwound from the supply spool or reel onto a receiving or take-up spool or reel. Movement of the wire from one spool to the other may be effected in various ways. Where the wire is drawn onto a receiving reel by driving that reel a problem is introduced in maintaining the tension of the wire constant, due to the fact that the wire is wound onto the receiving reel at varying distances from the center or axis of the reel. For satisfactory recording and reproducing operations, the speed of the recording wire should be constant, as was stated above. In order to maintain the movement of the wire at such constant speed, particularly past the recording electromagnet, the magnetic record wire is wound around a sheave, and the sheave is rotated at a constant speed by a motor to pull the wire from one reel and supply it to the other reel. The speed of the wire is thus maintained constant in its movement from the supply reel onto the take-up or receiving reel.

As it moves from the supply reel to the take-up reel, the magnetic record wire is moved past the recording magnetic head in such manner that the wire constitutes a moving armature continuously in contact with two magnetic pole pieces of the head. Those pole pieces are magnetized according to the impressed signals, and a continuous record is thus made on the wire of the varying magnetic conditions of the recording magnetic head as the wire passes the magnetic head.

During the recording operation or during a subsequent reproducing operation, the speed of the wire is relatively slow—of the order of a foot per second. After a recording operation has been performed, and it is desired to rewind the wire back from the take-up reel onto the original supply reel so that the wire may be moved forward again for reproducing or for playback operation, it is not necessary to move the wire at such a slow speed. To reel the wire back it is in fact desirable to move the wire at a relatively fast speed so that as little time as possible need be consumed in rewinding the recorded wire from the take-up reel back onto the supply reel. A high reeling speed is also desirable whenever a particular portion of the record member containing a desired record is required.

It is, therefore, desirable under different conditions to be able to wind the wire at a high speed in the forward direction, as well as at a high speed in the backward direction. For that purpose, a high-speed motor driving connection is provided for the driving sheave for a high-speed operation in forward or in backward direction.

In the recording mechanism shown, a separate motor is employed for reeling the recording member during the relatively slow recording and playback operations. A relatively slow driving force is derived from that motor by a speed-reducing and filtering system comprising a relatively-large, rubber-tired idler coupling roller through which the motor shaft imparts the desired constant slow speed to a capstan pulley or sheave which drives the wire.

In order to perform a fast reeling operation, the wire-driving sheave is driven directly at high speed by another motor rotating at high speed in either direction. Suitable safeguards are also provided to prevent simultaneous application of driving forces to the wire-driving sheave from both motors.

For that purpose, both electrical and mechanical interlocking arrangements are provided. By an electrical interlocking arrangement, electrical driving energy is supplied to only one motor at a time. At the same time, the mechanical parts are controlled to prevent a mechanical driving connection between one motor and the sheave whenever the other motor is energized or coupled thereto.

When a magnetic record wire is wound onto the take-up reel or spool, or back onto the supply reel, it is desirable to control the winding of the wire onto either reel so it will tend to wind in layers instead of piling up all in one region on the reel that is the collecting or receiving reel for that operation.

To provide for such layer winding or level winding the two reels are mounted as part of a movable unit on a supporting shaft and the unit is arranged to be reciprocated on the shaft as the spools rotate. The speed of reciprocation of the two reels as a unit is controlled to correspond generally to the winding speed of the record member wire so that the wire will be wound relatively level on the receiving reel. In this manner, any tendency for the convolutions of the wire to become entangled or overlaid is avoided or reduced to a minimum. Alternatively, the level winding mechanism may be of the type described in the application Serial No. 550,571, filed August 22, 1944, by J. P. Arndt, Jr., et al., now Patent No. 2,535,478, of December 26, 1950.

In any operation where a filament or thread or, as in this case, a wire is unwound from a supply spool and wound onto a receiving spool, the problem arises of maintaining substantially uniform tensioning of the filament or wire. If the tension of the magnetic wire is not maintained constant, some slippage might result between the wire and the driving sheave, with consequent result that either the record as electromagnetically recorded in the wire would not correspond to the original signals, or the playback of a properly made record would not correspond to such record upon reproduction.

According to one phase of the invention, the problem of maintaining constant tension in the wire is solved by a differential drive unit mechanically connected between the two reels in such manner as to establish an automatically self-adjustable driving and reaction force between the two reels to control their relative speeds of rotation. Thus the tension of the wire is the same in the portion coming to the receiving reel as in the portion being at the moment released from the supply reel. Such differential mechanism automatically compensates for the difference in the speed between the layer being unwound from the supply reel and the layer being wound onto the receiving reel.

Another phase of the invention involves a novel limit-indicating and control device which indicates and operates when the end portion of the unreeling part of the wire on the unwinding or supply reel is being approached. That limit device operates to stop the reeling operation in sufficient time before the actual end of the reelable record member or wire is reached and before it is released by the reel from which it is unwound.

*Drive and control arrangement*

Figure 2:
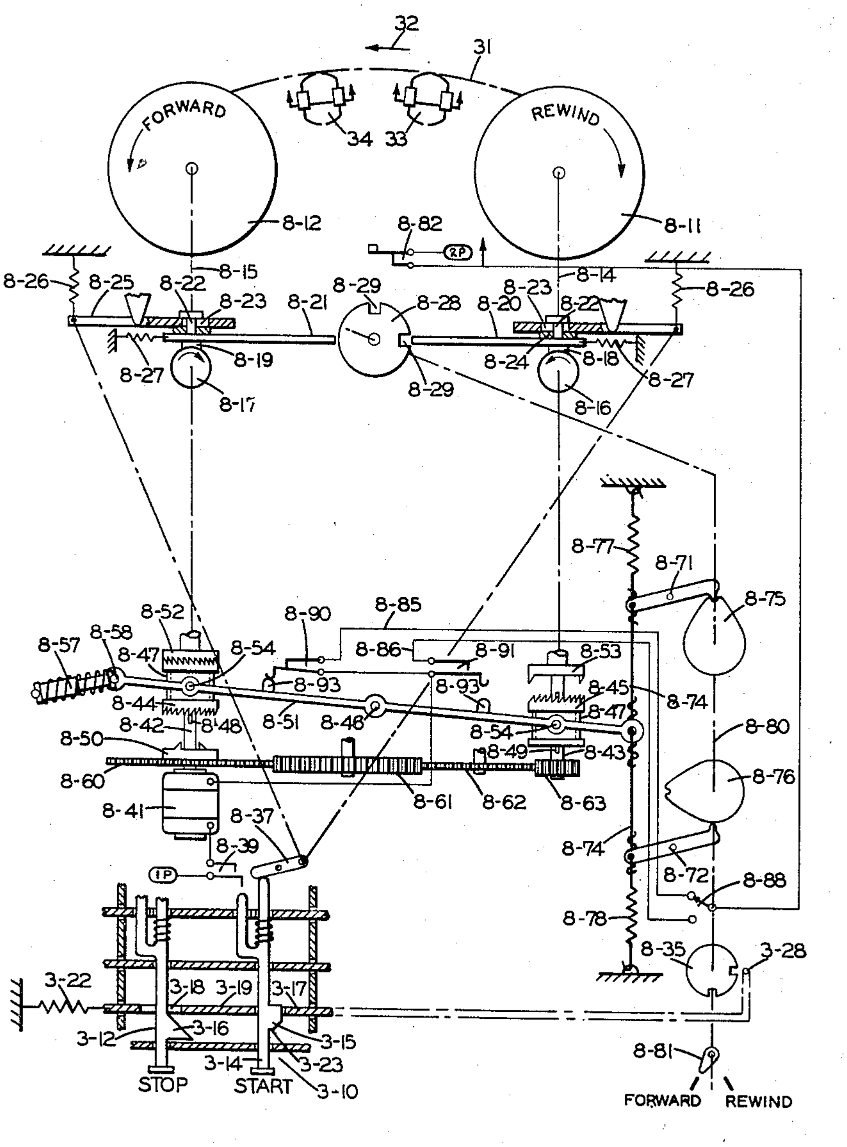
Fig. 2 is a similar diagrammatic view illustrating the general relationships of a modified form of a magnetic record transducing apparatus of the invention.
Figure 3:
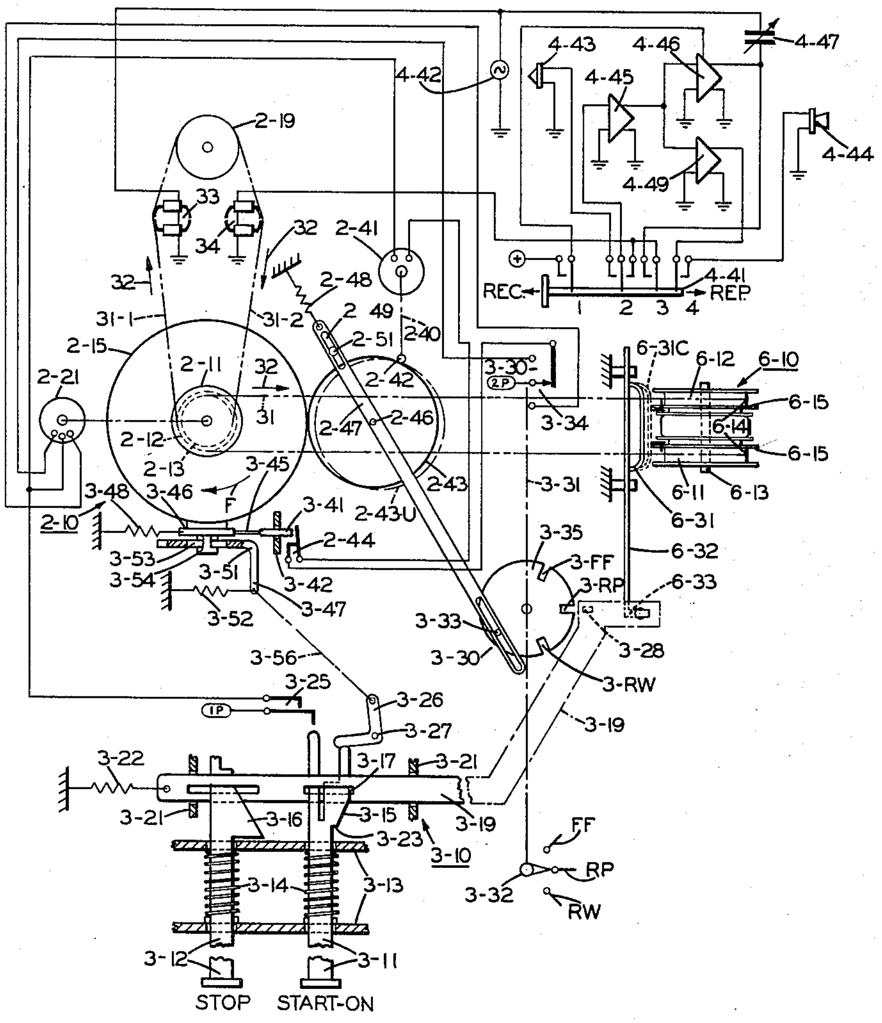
Fig. 3 is a view of a modification of the construction of Fig. 1 and incorporating the features of the invention.

Figs. 1, 2 and 3 illustrate one type of drive and reeling control arrangement based on the principles of the invention. The intermediate or looped portion of the thin magnetic record medium 31 leading from supply reel 6—11 to take-up reel 6—12 is guided over one guide track 2—12 of a revolvably mounted capstan member 2—11 by way of a loop section 31—1 towards a revolvably mounted idler 2—19 and therefrom by way of loop section 31—2 on to another guide track 2—13 of the capstan 2—11 and therefrom to the take-up reel 6—12, in the manner indicated diagrammatically in Fig. 1. The two reels 6—11, 6—12 form part of a reeling mechanism arranged so that the two reels revolve around a shaft 6—13 extending in a direction transverse to the direction of the axis of the capstan 2—11.

In order to secure satisfactory operation of a magnetic recording and reproducing apparatus operating with a reelable, long, thin record member, the reeling mechanism must be so designed as to assure that the record member is at all times maintained under correct and proper tension while in motion as well as at rest. Since the outer convolutions of the record member coils stored on the two reels 6—11, 6—12 must move at the same linear speed with which the tensioned intermediate cross loop is impelled past the record transducing heads 33, 34, the two reels on which the two record member coils revolve, will have the same angular speed only during the relatively short interval while the two record member coils have the same diameter, the two reels moving at different angular speeds under all other operating conditions and the reel with the record member coil of greater diameter revolving at a smaller angular speed than the reel with the coil of smaller diameter.

In the recording arrangement of the invention shown, the two reels 6—11, 6—12 form part of a reeling mechanism 6—10 so arranged that the axis of revolution of the two reels is in a direction substantially transverse or perpendicular to the general direction of a plane extending through the axis of revolution of the capstan 2—11, the capstan being arranged to be driven at a constant speed during a forward reeling operation in order to impel the record member 31 at a constant proper slow speed during a recording or playback operation.

In the recording arrangement shown, the reeling mechanism 6—10 is of a novel type described more fully hereinafter and so arranged that the two reels 6—11, 6—12 are interconnected by a reversible motion-transmitting connection which causes the reel from which the record member is unwound to impart to the reel on which the record is wound a motion which assures that the wire is at all times maintained at a proper tension. However, the reeling mechanism of the type shown in Fig. 1 may also be of the type described in the application Serial No. 550,571, filed August 22, 1944, by J. P. Arndt, Jr., et al., now Patent No. 2,535,478 of December 26, 1950, assigned to the assignee of the present application.

The capstan or sheave 2—11 drives or impels the wire in a selected direction and is connected to and driven by a high-speed capstan motor 2—21 that is reversible so that the capstan 2—11 may be driven at high speed in either direction as selected by the operator of the apparatus. During forward reeling from supply reel 6—11 to take-up reel 6—12, motor 2—21 drives the capstan in clockwise direction as indicated by arrow F. The high speed in the forward direction is utilized, for example, during playback operation when it is desired to locate some particular portion of the wire that contains the desired recording. When the capstan motor 2—21 rotates in counterclockwise direction, it drives the capstan 2—11 at high speed to rewind the wire from the take-up reel 6—12 back on to the supply reel 6—11.

In order to drive the capstan 2—11 at the required constant slow speed in forward direction for impelling the record member past the heads 33, 34 at a constant slow speed during a recording or playback operation, there is provided an additional slow speed drive motor 2—41 having a shaft 2—40 holding a small roller 2—42 which drives the capstan through a filter system including a revolvably-mounted, rubber-tired idler or coupling roller 2—43 movable into and out of engagement with a fly wheel 2—15 which is concentrically affixed and arranged to revolve with the capstan 2—11 and may form an integral part therewith. The idler roller 2—43 is revolvably mounted at 2—46 on a slider plate 2—47, one arm of which is biased as by a spring 2—48 so as to bring the coupling idler 2—43 from the dash-line uncoupling position shown to the full-line coupling position 2—43 during a slow forward reeling operation in which the shaft of the slow speed drive motor 2—41 imparts through coupling pulley 2—43 and fly wheel 2—15 the desired constant low speed rotation for impelling the recording medium in forward direction during the recording or playback operation. The capstan 2—11 with its fly wheel 2—15, the guide idler 2—19 and the two motors 2—21, 2—41 are all revolvably mounted on suitable elements or members of a frame structure 2—50 (Figs. 2 and 3) of the recording apparatus.

The slider plate 2—47 of the coupling roller 2—43 is mounted for sliding movement along suitable supporting elements of the frame structure. As indicated in Fig. 1, one arm of the slider plate is provided with a guide slot 2—49 slidably engaging a retaining member 2—51 in the form of a shoulder screw or post suitably affixed to the frame structure so as to confine and guide the movement of the coupling roller 2—43 between its full-line coupling position shown and the dash-line uncoupling position 2—43-U in which it couples the shaft of the slow speed drive motor 2—41 to the fly wheel 2—15 of the capstan 2—11 for driving it at the proper low constant speed during a slow forward reeling operation.

The various drive and coupling operations are controlled by the control mechanism generally indicated at 3—10. In the form shown, it comprises a plurality of control members 3—11, 3—12 shown in the form of button-operated push rods. The control members 3—11, 3—12 form part of a mechanism generally similar to a conventional push-button rod control mechanism in which a plurality of button-operated control push rods are arranged to be retained and latched in an inward operated position by a spring or otherwise biased latch bar, a latched control push rod being released from the latched condition whenever any other push rod is actuated to the inward position. Such conventional push-rod control mechanisms are also frequently provided with a release push rod which cannot be latched and is at all times biased to an outward released position, but which serves to release any of the operated latched push rods whenever the released push rod is momentarily actuated to an inward releasing position.

In the control mechanism shown, the two control members 3—11, 3—12 have the form of push rods slidably held and guided in guide walls 3—13 of a mounting structure, each of the push rods being shown provided with suitable biasing means, such as an encircling compression spring 3—14 arranged so as to bias and tend to return its associated push rod to an outward position whenever the push rod has been actuated to an inward position against the opposing biasing forces of its biasing means 3—14. The two push rods 3—11, 3—12 are provided along their inward regions with cam surfaces 3—15, 3—16, respectively, extending through slits 3—17, 3—18 of a latch bar 3—19 slidably mounted in mounting wall portions 3—21 of the mounting structure and biased by biasing means, such as a spring 3—22 for sliding movement in lateral direction so as to retain the push rod 3—11 in an inward latched position when it is pushed in inward direction until the shoulder portion 3—23 of its cam surface passes through its latch bar slit 3—17.

The inclined cam surface 3—15 of the push rod 3—11 is so shaped and its biasing spring 3—14 is so designed in relations to the biasing spring 3—22 of the latch bar 3—19 that, with the push rod 3—11 held in its inward position by latching engagement of its cam shoulder 3—23 with the edge of the latch bar slit 3—17, the latch bar 3—19 is actuated against the action of its biasing spring 3—22 slightly to the right to permit the inclined surface portion 3—15 of the push rod 3—11 to enter the latch bar slit 3—17. The biasing action of the biasing spring 3—14 of the push rod will return the push rod 3—11 to its outward position while its inclined cam surface 3—15 will actuate the latch bar 3—19 to the full-line released position shown.

The other push rod 3—12 of the control mechanism 3—10 has a cam 3—16 so shaped that when it is pushed inwardly the engagement of the cam surface 3—16 with the slot 3—18 of the latch bar will actuate the latch bar to the right and assure that whenever the push rod 3—12 has been actuated to the inward position the start-on push rod 3—11 is instantaneously released from an inward latched position and permitted to return to the outward released full-line position in which it is shown. The cam surface 3—16 of the stop push rod 3—12 is so shaped that it can never be pushed to an inward position in which it could be latched by the latch bar 3—19.

In the arrangement shown, the start-on push rod serves to control the operation of a motor-energizing switch 3—25 and a control lever 3—26 shown pivotally mounted at 3—27 whenever the start-on push rod is actuated from the released outward position shown to an inward operated position in which it is latched by the latch bar 3—19. The switch 3—25 and the control lever 3—26 are shown operated by suitable prongs of the push rod 3—11 and they may be mounted in a conventional way on the substantially rigid mounting structure of the button-operated push rod mechanism.

The push rod control mechanism described above serves to start and to stop all reeling operations whether a slow forward reeling operation or a fast forward or a fast rewind operation, an additional selector mechanism being utilized to selectively set or select the character of the reeling operation.

In the form shown, the selector mechanism, generally designated 3—30, comprises a rotatably mounted shaft 3—31 which is operated by a selector knob 3—32 to one of three different angular operating positions, namely, to positions indicated by the legends FF for fast forward reeling, RP for slow forward reeling during a recording or playback operation, and RW for fast rewind. In the arrangement shown, the selector shaft 3—31 is utilized to operate a three-position switch 3—34 to one of three contact positions corresponding to the three selector positions FF, RP, RW. When the selector knob is in the FF position, the movable contact blade of switch 3—34 connects lead 2-P of the power supply line to one of the three terminals of the fast reeling motor 2—21 so as to prepare an energizing circuit for this motor for causing it to rotate the capstan 2—11 at a high speed in a clockwise forward direction F during a fast forward reeling operation, the energizing circuit to this fast reeling motor 2—21 being completed only when the additional motor energizing switch 3—25 completes the common circuit connection of this motor to the lead 1-P from the power supply terminal of opposite polarity.

When the selector shaft is in position RW, its selector switch 3—34 connects in a similar manner another terminal of the fast reeling motor 2—21 to the power supply lead 2-P for energizing the motor to drive the capstan at a fast speed in counter-clockwise direction and performing a fast rewinding operation.

When the selector shaft 3—31 is set in position RP, the selector switch 3—34 connects the power supply lead 2-P to the slow reeling speed motor 2—41 for energizing this motor to drive through coupling roller 2—43 the fly wheel and capstan 2—11 at a required constant low speed in forward direction during a recording or playback operation.

The selector shaft 3—31 is also shown utilized to operate a rotary cam member 3—35 arranged to be turned to three different positions corresponding to the three different settings FF, RP, RW of the selector knob. In the arrangement shown, the selector cam 3—35 is utilized to selectively control the position of the coupling roller 2—43 and cause it to move and be retained either in the full-line coupling position shown or in the dash-line uncoupling position 2—43-U depending on the position of the selector shaft and its knob 3—32.

In the arrangement shown, the selector cam member 3—35 is provided with a generally circular cam surface having a cut-off surface portion 3—36 and designed for cooperation with a facing portion of a coupling lever 3—37 shown pivotally mounted at 3—38 on a fixed element of the frame structure and pivotally connected at 3—39 with the slider plate 2—47 of the coupling roller 2—43 and arranged so as to selectively actuate to and retain the coupling roller 2—43 either in the full-line coupled position shown or in the dash-line uncoupling position depending on the setting of the selector cam 3—35.

In the arrangement shown diagrammatically in Fig. 1, this is accomplished by shaping and arranging the cam surface portions of the selector member 3—35 and the cooperating elements of the coupling lever 3—37 and the other elements of the coupling mechanism so that when the selector shaft 3—31 with its knob are in the RP, slow forwarding setting, the cut-off cam section 3—36 of the selector cam 3—35 permits the coupling lever 3—37 to pivot around its pivot 3—38 in upward direction as seen in Fig. 1, thereby permitting the biasing spring 2—48 of the slider member 2—47 to bring and retain the coupling roller 2—43 in the full-line coupling position in which the slow speed reeling motor 2—41 will drive the fly wheel 2—15 and the capstan 2—11 at the proper low constant speed during a forward recording or playback operation; and that upon turning the selector cam 3—35 from the slow reeling RP position shown, either to the fast forward FF or fast rewind RW position, one or the other of the cam surface portions of the cam member 3—35 bordering its cut-off cam portion 3—36, will engage the cooperating portion of the coupling lever 3—37 and turn it around its pivot 3—38 for bringing the slider member 2—47 and the coupling roller 2—43 from the coupling position shown to the dash-line uncoupling position 2—43-U and retain it therein, and thus break the slow speed driving connection to the capstan as long as the selector cam is either in the FF fast forward or in the RW fast rewind settings.

In the arrangement shown, the selector cam member 3—35 is also utilized to lock the selector mechanism and the elements operated or controlled thereby in either one of its different operating positions as long as the reeling mechanism is in motion and thus prevent damage, such as breaking and entanglement of the wire or any other injury to the reeling mechanism by inadvertent reversal of a reeling operation before first bringing all the critical elements of the mechanism to a stop.

In the arrangement shown, the selector member 3—35 is, to this end, provided with three locking recesses 3-FF, 3-RP, 3-RW corresponding to the three settings of the selector switch and arranged for interlocking engagement with a locking projection or lug 3—28 of the latch bar 3—19, in such manner that whenever the starting push button 3—11 is actuated to an inward operated position, thereby releasing the latch bar 3—19 to a leftward latching position to which it is biased by the spring 3—22, the locking projection 3—28 will enter one or the other of the three cam recesses 3-FF, 3-RP, 3-RW and lock the cam member with the selector mechanism in a given angular setting position as long as the start push rod is in the inward operated position and the latch bar 3—19 is held in its leftward locking position by its biasing spring 3—22.

With a reeling mechanism of the type described above, it is important to assure that a reversal of a reeling operation is rendered impossible before first bringing the moving elements of the reeling mechanism to a stop, otherwise it might be possible for an operator—after first actuating the stop rod 3—12 and releasing the start-on rod 3—11 to the non-operated position, and thereby returning the latch bar 3—19 to the right-hand non-latching position in which it is shown—to turn the selector knob and the selector cam 3—35 from the fast rewind setting RW to a slow forward setting RP, for instance, and immediately actuate the start-on rod 3—11 to the inward starting position before the rotating elements of the mechanism which were rotating at a high speed were brought to a dead stop. Accordingly, provisions have to be made to prevent a premature reversal of the reeling operation which would result in the breakage of the wire before the rotating elements of the mechanism have been first brought to a dead stop.

In the reeling mechanism of the type shown in Fig. 1, no excessive strain would be imposed on the filamentary record member 31 if a slow reeling operation in forward direction were started before first bringing the capstan to an actual stop from a fast forward operation. However, if a slow forward operation were started following a fast rewind operation in counter-clockwise direction before bringing the capstan and the other rotating elements of the mechanism to a stop, the filamentary recording medium might be subjected to a strain sufficient to cause it to break.

According to one phase of the invention, a reeling mechanism of a magnetic recording apparatus is combined with means operated by a moving or revolving member of the reeling mechanism for exerting a preventive action preventing a reversal of the direction of the reeling operation until one of the moving elements of the reeling mechanism participating in or controlling the reversal of the direction of the reeling motion has been first brought to a stop. In the arrangement shown, the capstan 2—11 with its fly wheel 2—15 which is utilized to impart to the recording member 31 a reeling motion in forward direction or in rewinding direction is utilized as the revolving member for operating a locking element which is operative to prevent a reversal of the direction of the reeling motion before it was first brought to a stop.

In the recording arrangement shown, the locking element is formed by a latch rod or bar 3—41 which is suitably guided in guide openings of guide elements 3—42 so as to be movable between the retracted or unlocking position shown and the outward dotted-line position 3—41–L in which it is interposed on the path of a locking lug 3—44 extending from the coupling lever 3—37 so as to lock the coupling lever 3—37 in the dash-line uncoupling position 3—37–U and thus prevent the coupling lever 3—37 from bringing the coupling roller 2—43 from the uncoupling position to the coupling position, as long as the latch rod 3—41 is interposed in the path of the motion of the locking lug 3—44 of the coupling lever. In accordance with the invention, one or more of generally analogous locking members may be combined with the elements of a reversible reeling mechanism of a magnetic recording apparatus and arranged so that when reversing a reeling operation, the locking member is actuated by the associated revolving element to lock an element of the reversing mechanism and hold it locked until the reeling mechanism is first brought to a stop.

In the recording arrangement shown in Fig. 1, the locking bar 3—41 is shown connected through a link 3—45 to a brake shoe 3—46 having a brake pad arranged to be held by a brake arm 3—47 against the periphery of the capstan fly wheel 2—15 whenever the capstan with its fly wheel, while rotating in counterclockwise direction, are brought to a stop, so that the frictional engagement between the fly wheel which is moving in counterclockwise direction and the brake pad of the brake shoe 3—46 causes it and therethrough the lock bar 3—41 to be moved from the retracted position shown to the latching position against the biasing action of biasing means indicated by a spring 3—48 tending to return the lock bar 3—41 to the retracted full-line position.

As indicated in Fig. 1, the brake lever 3—47 is shown pivotally mounted at 3—51 and biased by a spring 3—52 to press the brake shoe toward the periphery of the fly wheel. The brake shoe 3—46 is arranged to be slidably movable along an opening 3—53 of the brake lever, being retained therein by suitable means, such as a shoulder screw or post 3—54 and arranged so that whenever the brake lever 3—47 holds the brake shoe 3—46 in frictional engagement with the fly wheel 2—15, the frictional forces imported by the fly wheel rotating in counterclockwise direction will move the brake shoe 2—46 along its guide slot 3—53 in a direction which causes it to actuate the locking bar 3—41 from the retracted position shown to a dash-line locking position 3—41–L against the biasing forces of the retracting spring 3—48.

An additional brake shoe may be provided and arranged to operate through a similar linkage another lock bar whenever the capstan with the fly wheel 2—15, while rotating in clockwise direction, are brought to a stop for actuating the brake shoe to impose a similar lock bar in the path of the motion of a similar locking element of the coupling mechanism to prevent a change in the drive coupling connection, or, in general, in the mechanical connections of the driving mechanism incident to the reversal of the driving motion before the capstan with the fly wheel, or, in general, the impelling element which impels the record member 31, has been first brought to a stop. However, in the particular recording arrangement shown in Fig. 1, it is sufficient to provide only a safeguard against reversal of the driving operation of the type described and shown only under conditions when the capstan with the fly wheel rotate at a high speed during a rewinding operation.

In the arrangement shown in Fig. 1, means are also provided to automatically remove from the reeling and driving mechanism all braking forces whenever the normal slow or normal fast forward or rewind operation is performed and to apply the braking forces to quickly stop the reeling operation only when the reeling mechanism is actuated to stop while in motion. In the arrangement shown, this is accomplished by connecting the brake lever 3—47 through a link 3—56 to one arm of the lever 3—26 which is operated by the start-on control rod 3—11 in such manner that each time the start-on rod is actuated to the operative position for starting a reeling motion, the brake shoe 3—46 is removed from its braking engagement with the fly wheel, and that upon releasing the start-on control rod 3—11 by the operation of the stop rod 3—12, the biasing spring means 3—52 of the brake arm instantaneously returns the brake shoe into braking engagement with the fly wheel for stopping the motion of the capstan.

It should be pointed out in this connection that the main motor-energizing switch 3—25, which is likewise actuated to the operated closed position when the start-on push rod 3—11 is actuated to the inward operated position, is so arranged that when the start-on push rod is actuated to the inward operated position, it first removes the braking action of the brake shoe before closing the main motor-energizing switch 3—25, and that on releasing the start-on push rod, it first opens the motor-energizing switch 3—25 before the brake shoe 3—46 comes into engagement with the fly wheel 2—15 for stopping the rotation of the capstan 2—11.

Let it be assumed now that the recording apparatus of Fig. 1 has its selector mechanism 3—30 set by the selector knob 3—32 in the fast rewind position RW. In this condition, a circular raised portion of its selector cam 3—35 will hold the coupling lever 3—37 in the tilted dash-line uncoupling position 3—37-U in which the coupling roller 2—43 is held in the uncoupling position 2—43-U, and in which the selector switch 3—34 connects the power supply line 2-P to such terminal of the fast speed capstan motor 2—21 as to cause the capstan to be driven in counterclockwise direction when the motor is energized by actuation of the start-on push rod 3—11 and closure of the main motor energizing switch 3—25 by the start-on push rod 3—11.

If now the start-on push rod 3—11 is released by instantaneous actuation of the stop push rod, this will release the latch bar 3—19 from the left-hand latching position and it will return to the full-line unlatching position in which it is shown held by the push rod 3—11 in its released position. The instant the start-on push rod 3—11 is released, the brake shoe 3—46 will be instantaneously returned by the biasing spring 3—52 of its brake arm 3—47 to the braking position in order to apply to the fly wheel 2—15 a braking force for instantaneously stopping its motion. This instantaneous application of the brake shoe 3—46 to the fly wheel 2—15 rotating in counterclockwise direction will cause the brake shoe to instantaneously move its latch bar 3—41 into a locking position in which it is interposed across the path of the lock bar 3—44 of the coupling lever 3—37, thereby preventing the coupling roller 2—43 from being moved from the dash-line uncoupling position 2—43-U to the coupling position, even if the selector cam 3—35, which is now free from its locking engagement with the locking lug 3—28 of the latch bar 3—19, is rotated by the selector knob 3—32 from the fast rewind position RW to the slow forward position RP.

In the particular form of recording apparatus shown, the additional safeguards to prevent damage to the recording medium or the mechanism incident to a reversal of the reeling operation are required only when reversing from a fast-rewind to slow-forward reeling operation. Reversal from forward-slow to a fast-rewind operation introduces no difficulties because the flywheel 2—15, in rotating counter-clockwise, will automatically throw the coupling roller 2—43 from the coupling to the uncoupling position because the speed of the record member is so slow, that the application of the brake incident to the reversal assures stopping of the slow forward reeling before the fast reeling motor 2—21 is energized to effect a fast rewind operation. Reversal from fast forward to fast rewind is likewise without difficulties because the same motor and drive is used and the momentum of the rotating structures, including the flywheel, insures a gradual speed change.

With a magnetic recording apparatus arranged in the manner described above in connection with Fig. 1, a reeling operation may be started at any time from the raised position in which the two button-controlled rods 3—11, 3—12, are held by their biasing springs in their outward released position, by momentarily actuating the start-on push rod to the inward position wherein it is retained latched by the latch bar 3—19.

Depending on the setting of the selector mechanism 3—30 by means of the selector knob 3—32, the actuation of the start-on push rod 3—11 to the inward latched position will start and maintain a slow forward reeling operation in the direction of the arrow F when the selector mechanism with its pointer knob 3—32 is set in the RP position; or a fast rewind operation in a direction opposite to the arrow F when the selector mechanism with its selector knob 3—32 are set in the RW position; or a fast forward reeling operation in the direction of the arrow F when the selector mechanism with its knob 3—32 are set in the FF position.

When the start-on push rod is actuated to the inward operated position with the selector mechanism set in the slow forward reeling position RP, the start-on push rod 3—11 will actuate its control lever 3—26 to remove the braking action from the capstan fly wheel 2—15 and actuate its switch 3—25 to complete the energizing circuit for the slow forward drive motor 2—41 and this motor will drive through the retractible coupling roller 2—43 and the fly wheel 2—15 the capstan at the required low speed in the forward direction F for carrying on either a recording or playback operation depending on the setting of the recording playback switch 4—41.

When the start-on push rod 3—11 is actuated to the inward operated position while the selector mechanism is set by selector knob 3—32 in the fast rewind position RW, the operated start-on push rod 3—11 will actuate its switch 3—25 to energize the fast reeling motor 2—21 to drive the capstan at a high speed in a direction opposite to the direction of the arrow F for rewinding the recording medium at a fast rate on the supply reel 6—11.

When the start-on push rod 3—11 is actuated to the inward operated position while the selector mechanism is set by knob 3—32 in the fast forward position FF, the operated push rod 3—11 will actuate its switch 3—25 to complete the other energizing circuit of the fast reeling motor 2—21 for driving the capstan 2—11 at a high speed in the forward direction of the arrow F for enabling the user to locate quickly a desired portion of the great length of the recording medium stored in spirally-wound form on the two reels 6—11, 6—12.

The form of the innvention shown in Fig. 1 also safeguards the fragile record track against undue stresses that might be applied when, during a rewinding, the stop push rod 3—12 is actuated to its inward position, the controls thereby unlocked shifted to the slow forward reeling position RP and the start push rod 3—11 actuated before the rewinding has come to a halt. This sequence of manipulation is possible with the construction of Fig. 1 but the components are so arranged that the reeling reversal is not affected until after the rewinding has come to a standstill. Thus, the brake shoe of the apparatus shown has a concave face which causes it to move rearwardly away from the flywheel 2—15 and tilt the brake lever 3—47 against the action of spring 3—52 at the same time as the brake shoe is impelled to the right for locking purposes. In other words, the side portions of the shoe which project outwardly towards the face of the flywheel 2—15 further than the central portions of the shoe cause the shoe to move back as it is moved into latching position. The amount of this rearward motion is only about as much as the clearance space provided between the shoe and the flywheel 2—15 when the shoe is retracted by the operating lever 3—26 under the control of the start push rod 3—11. By this arrangement it becomes impossible to have the operating lever 3—26 retract the brake shoe rearwardly away from braking and latching contact with the flywheel 2—15 when the brake shoe is held in the extreme right hand latching position. Accordingly, the actuation of the start push rod 3—11 before a rewinding has been completely stopped can not withdraw the brake shoe from braking engagement with the flywheel 2—15 and the braking action continues until the flywheel stops rotating thereby permitting the brake shoe retractor 3—48 to withdraw the latch 3—41 from latching position and permitting rearward motion of the brake shoe away from contact with the flywheel.

Without the above action it will be evident that the record track could be seriously over-stressed when the rewinding operation is suddenly converted to a forward reeling by actuation of the start push rod according to the described manipulation.

Other arrangements may also be used for preventing reversal of the record track reeling during the time when the locking lug 3—28 is not in engagement with the cam 3—35. For example, the cam 3—35 may be shaped so as to provide depressions, similar to that shown in 3—36, for receiving the follower nose 3—40 of the coupling lever 3—37 in the control positions for rewinding and fast forward reeling. The additional cam depressions may be separated from the depression 3—36 by barriers extending out from the cam surface for causing the nose 3—40 to prevent rotation of the cam when the coupling lever 3—37 is held in the uncoupled dash-pot position 3—37-U shown in Fig. 1. The latch 3—41 may be formed with twin sliding elements one of which engages below the uncoupled position of the latching ear 3—44 on the coupling lever and prevents its retraction beyond the dash-dot position shown in Fig. 1. In this form of the invention, braking action would also latch the coupling lever either in the coupling full-line position or in the uncoupled dot-dash line position shown and prevent its further downward tilt from either position. The operating cam 3—35 would accordingly be locked during the braking action until reeling is stopped.

Other arrangements for insuring the prevention of record track reversal before complete stoppage include the mounting of the brake latch 3—41 in such position that the start push rod 3—11 can not be actuated when the latch is ejected as by a braking action. For this method of operation the brake latch 3—41 may merely be arranged to project into the path of an extension of the start push rod 3—11 whenever braking action is being applied.

As explained above, each time the start-on push rod 3—11 is actuated to the operated position, it will remove the brake 3—46 from its braking engagement with the flywheel 2—15 of the capstan 2—11. However, any of these reeling operations may be instantaneously stopped by momentary actuation of the stop push rod 3—12, thereby releasing the start-on push rod from the inward operated position to the released position, in which it is shown, whereupon the energized motor is cut off from the energy supply by the opening of switch 3—25 and the brake 3—46 is released into braking engagement with the flywheel of the capstan 2—11, thereby bringing it quickly and substantially instantaneously to a stop.

In addition, as explained before, a reversal of a reeling operation from fast-rewind to a slow-forward, or a fast-forward reeling operation is subjected to the special interlocking action which prevents the effecting of such reversal of the reeling operation before first bringing the revolving elements of the mechanism to a stop.

The magnetic record transducing apparatus of Fig. 1 is shown provided with mechanical means which operate automatically to stop the reeling operation whenever the end region of a reelable record member stored on the reel from which it is unwound is approached and before the end of the record member is actually reached and released from the reel. This phase of the invention constitutes the subject matter of application Serial No. 732,970, filed March 7, 1947, by A. L. W. Williams.

Another feature of the invention is the added assurance provided against excessive record track tension when reversing any reeling operation. In the form shown in Fig. 1 the brake shoe is so arranged that the braking action applied to stop rotation causes extension of the brake spring 3—48. After the reeling is stopped, the brake shoe is therefore retracted by the return of the extended spring and being still in frictional engagement with the flywheel it will impart a small momentary reversed reeling rotation to the flywheel and the record track. In this manner not only is the reeling stopped slowly but reversal is effected in easy stages. This is especially valuable in shifting from one reeling to a reversed high speed reeling where the sudden acceleration of the record track in reversed direction is particularly severe.

For complete protection the braking arrangement may be made double acting so as to inject an easy reversal stage when reeling in either direction. The brake latch lever 3—45 may for example be held between two oppositely biasing springs so that it follows the flywheel rotation under all braking conditions. Two oppositely directed latch extensions such as the one shown at 3—41 may also be used to prevent control shifting during either type of braking.

The construction of the invention also incorporates additional features. The small reversal of the record track by the brake after being stopped makes it possible to substantially avoid overrunning of portions of the record track. Thus when a dictated message magnetically recorded on the record track is played back, by a typist for example, for the purpose of recording the message with a typewriter, it is necessary to stop and start the slow forward reeling many times. This would ordinarily render parts of the recording unintelligible where the record track is moved at varying speeds during deceleration and acceleration. With the arrangement of the invention, however, the stopping of a transducing will be followed by a reeling reversal sufficient to rewind the record track transduced during the deceleration overrun after the stop push-rod is actuated. The small reeling speed used also permits the small reversal to return the additional amount of recording that would be rendered unintelligible because of the acceleration of the record track when transducing is resumed. The construction of the invention accordingly enables interrupted playback or recording with substantially no loss of transducing and with a minimum of gaps in the recording. This form of the invention includes a brake control arrangement operating in the direction opposite to that shown in Fig. 1.

In the form shown the limit operation is provided by interconnection between the control elements and the record track holders 6—11, 6—12. These holders contain outwardly biased limit members 6—21 extending through a slot in the wire receiving floor of the reels and adapted to be held down in retracted position by the wire coil on it. Adjacent the reels is mounted a loop arm 6—31 pivotally held on shaft 6—32 as shown and arranged to be held in the path of the pivoted limit members 6—21 when in their extended positions. The shaft 6—32 has an extending crank 6—33 engaging with the slide latch bar 3—19 as shown, so that when the loop arm is rotated from the dash-dot position 6—31-C to the full line position, the slide bar 3—19 is moved a small amount against the holding action of its bias 3—22, enough to disengage the wall of slot 3—17 from the latch ledge 3—23. The start on push rod is thereby permitted to pop out under the urging of its spring 3—14, terminating the reeling action in the manner described above.

With the above interconnection the reeling of the record track is arranged to take place with the limit loop arm 6—31 in the dash-dot position 6—31-C adjacent the reel peripheries as by the linkage with the slide latch plate 3—19 which is brought in the latch position by the bias 3—22 whenever reeling is started. During reeling the limit members 6—21 are held in by the covering turns of wire until the last layer of turns are unwound from the supply reel, when the limit member on this reel is released and extended and the continued rotation of the supply reel causes the extended limit member to engage the loop arm 6—31 and impel it into the full line unlocking position, stopping the reeling. Both reels may have limit members as shown to stop the reeling both in the forward and reverse directions.

Other limit controls may be used as shown for example in the above-mentioned copending Williams application, copending Begun applications, Serial No. 723,735, filed January 23, 1947, and Serial No. 537,288, filed May 25, 1944, now Patent No. 2,513,616 of July 4, 1950, copending Dank application Serial No. 690,878, filed August 16, 1946, now Patent No. 2,535,486 of December 26, 1950, or the copending Kornei application Serial No. 776,523, filed September 27, 1947.

The record track may be of the filamentary or tape types. With the tape form of record track it is usually preferred, in Kornei type magnetic record transducers, that the forward reeling be automatically stopped before the record track is completely unwound from the supply reel to avoid the necessity of re-anchoring the end of the record track for rewinding. The limit mechanism may be arranged to permit the record track to completely unwind during the rewinding so that the record track may be more conveniently exchanged for further transducing.

Fig. 2 shows another form of magnetic record transducing apparatus of the invention. In this construction the record track 31 may be held on a supply reel 8—11 and impelled in a forward direction past erasing and transducing heads 33, 34 by anchoring the record track end on a take-up reel 8—12 and rotating the take-up reel 8—12 in counterclockwise direction as indicated by the arrow 32. The reels 8—11, 8—12 may be held on rotatable shafts 8—14, 8—15, respectively, arranged to be driven by a suitable impeller such as the motor 8—41. The same motor may be used for impelling the record track in the reverse direction, as by incorporating a reversing mechanism one type of which is illustrated in Fig. 2.

As shown, the motor 8—41 directly drives a motor shaft which carries a coupling clutch roller 8—44 longitudinally slidable along the shaft and rotated with the shaft by means of a pin (not shown) extending through a longitudinal slot 8—48 in the shaft as well as through the roller. Rotatably held on the shaft 8—42 on one side of the roller is a reverse coupling member 8—50, and on the other side of the roller is a forward coupling member 8—52.

Both ends of the clutch roller 8—44 are toothed for engagement with matching teeth on the faces of the respective coupling members 8—50 or 8—52. On the forward clutch coupling member 8—52 is secured the take-up reel shaft 8—15 so that when the coupling roller 8—44 is engaged with the forward clutch member 8—52, as shown in Fig. 2, the take-up reel 8—12 is impelled to move the record track in forward direction.

The clutch coupling member 8—50 carries a gear 8—60 connected to drive a second stub shaft 8—43 through a chain of gears 8—61, 8—62 and 8—63. A second clutch roller 8—45 is slidable along a slot 8—49 and rotatable with the stub shaft 8—43 in a manner similar to that shown for clutch roller 8—44. Another coupling member 8—53 carried on supply reel shaft 8—14 is rotatably mounted on stub shaft 8—43 and carries teeth for engagement with corresponding teeth on the adjacent face of clutch roller 8—45.

Both clutch rollers 8—44, 8—45 are linked together by a shifter fork 8—51 which may be tiltably held at 8—46 and connected to the rollers for sliding them along the slots in their mounting shafts. In the form shown in Fig. 2, the rollers carry peripheral sleeves 8—47 to which the shifter fork is secured by pivot pins 8—54 and in which the rollers rotate.

An overcenter bias is provided by the compression spring 8—56 urging apart the telescoping support 8—57 fitted between a fixed base and a pin 8—58 on the shifter fork. With this construction the shifter fork may set into the forward reeling position shown, where it holds the clutch roller 8—44 in engagement with the coupling member 8—52 of take-up reel shaft 8—15 for the direct drive of this shaft by motor 8—41. The shifter fork 8—51 may also be tilted in counterclockwise direction around pivot 8—46 to the rewinding position, where the clutch roller 8—44 is held in driving engagement with coupling member 8—50, and clutch roller 8—45 is simultaneously held in driving engagement with coupling member 8—53 for impelling the supply reel shaft 8—14 through stub shaft 8—42, roller 8—44, coupling member 8—50, gears 8—60, 8—61, 8—62, 8—63, stub shaft 8—43, roller 8—45 and coupling member 8—53. An even number of gears are used for reversing the direction of rotation and for properly impelling the supply reel although, if desired, the record track may also be coiled on the supply reel by rotating this reel in counterclockwise direction so that no reversal of impelling rotation is necessary. The gear train may be arranged for providing rewinding at a speed higher than the forward reeling, as by using a first drive gear 8—83 having fewer teeth than the first gear 8—60, as shown, so that rewinding may be effected at a speed much higher than the forward reeling.

Shifting of the transmission is provided in the construction of Fig. 2, by connecting the end of the shifter fork 8—51 through control links 8—74 with a pair of pivoted cam followers 8—71, 8—72. The cam followers are held in engagement with lobed surfaces of a pair of control cams 8—75, 8—76 by the biasing springs 8—77, 8—78, and the control cams are held in a control shaft 8—80 for manual rotation by means of a pointer knob between the forward position shown in full lines and a rewind position shown in dash-dot lines. In the forward reeling position the upper cam follower 8—71 has its nose held in a projecting notch on cam 8—71, while the lower cam follower rests against a lower portion of its operating cam 8—76, permitting the spring 8—78 to pull and hold the shifter fork in the position shown. Rotation of the pointer knob to the rewind position as indicated by the legend, moves the cams to their dash-dot positions in which the cam follower 8—72 is rotated to stretch its spring 8—78 while the cam follower 8—71 is released, permitting the spring 8—77 to pull the shifter fork into and hold it in the rewind position.

On the reel shafts 8—14, 8—15, there are provided brakes shown in the form of drums 8—16, 8—17 secured to the respective shafts, and brake shoes 8—18, 8—19 held on slidable bars 8—20, 8—21 for pressing engagement with the drums. The brake shoes 8—18, 8—19 have pin extensions 8—22 slidably guided in a slot 8—23 of the pivoted brake levers 8—25 between an enlarged head on the pin and a washer 8—24. The brake levers 8—25 are biased to the brake-apply position in which they are shown, as by springs 8—26, and the brake shoes are biased by springs 8—27 toward a retracted position in which the rods 8—20, 8—21 are kept out of engagement with a locking cam 8—28 fixed to an extension of the control shaft 8—80.

The locking cam 8—28 is shown as provided with a plurality of notches 8—29 arranged to receive the ends of the respective brake shoe bars in the respective positions of the control shaft 8—80. Another locking cam 8—35 is provided on the reversing control shaft for coaction with a manual start-stop control 3—10 which may be similar to that shown in Fig. 1.

The start-stop control 3—10 includes a pair of operable push rods 3—12, 3—14, outwardly biased and having cam lobes 3—16, 3—15 coacting with slots 3—18, 3—17 in a transversely slidable latch plate 3—19 biased toward a left-hand latching position by spring 3—22. The latch plate is shown in the unlatched position in which an extension 3—28 is held away from a notch in locking cam 8—35. Both the stop and start push rods are shown in their outer inoperative position from which they may be manually moved to inner operated positions by pushing button-shaped heads with which they are provided.

When the start push rod 3—14 is inwardly operated, the latch plate bias brings the right-hand wall of slot 3—17 into engagement with a ledge portion 3—23 of the cam lobe 3—15 and holds the rod against outward movement. At the same time the latch plate extension 3—28 is moved into one of the notches of locking cam 8—35, locking it against rotation. Reeling control action is provided by a pivoted brake control arm 8—37 and a drive-energizing switch 8—39 arranged for operation by the start push rod 3—14 in its inward position.

The brake control arm 8—37 is shown as linked to the brake levers 8—25 for disengaging the brake shoes from their drums when the start push rod 3—14 is operated. The switch 8—39 normally in the open position shown, is closed by the inwardly actuated start push rod for completing an energizing circuit for motor 8—41 from the two terminals of a source indicated by 1P and 2P respectively. An on-off switch 8—82 may also be placed in the circuit for preparing the apparatus for operation, as by energizing the amplifier through the power lead shown, in addition to the motor circuit.

The motor energizing circuit is shown as arranged to prevent the application of stresses to the record track 31 because of any time delay in the shifting of the shifter fork 8—51 which may permit a small amount of reeling in one direction as it is shifted, followed by a sudden application of reeling forces in the reverse direction. In the form of the invention shown in Fig. 2, this desirable result is obtained by splitting the supply lead into two branches 8—85, 8—86 separately energized by a blade of a switch 8—88 mounted for rotation with control shaft 8—80 and movable to supply either branch, depending upon the setting of the pointer knob 8—81. The branches 8—85, 8—86 are united through a pair of normally open switches 8—90, 8—91 respectively, coacting with knobs 8—93 on the shifter fork for completing the energizing circuit through the proper branch for the selected operation.

Accordingly, when the reversing control 8—81 is shifted from one position to the other, the reeling motor 8—41 is immediately deenergized by movement of the blade of switch 8—88, opening the branch circuit used before shifting. The energization of the motor through the other branch is not complete until the shifter fork has tilted to the new position, so that there is no possibility of overstressing the record track.

The provision of slidable brakes associated with the reel rotation, similar to the construction of Fig. 1, assures the prevention of reeling reversal until the reeling is completely stopped. Thus, when reeling in the rewind direction, for example, the actuated position of start push-rod 3—14 keeps the reeling direction selector 8—81 locked through the engagement of latch plate extension 3—28 with locking cam 8—35. When the stop push rod 3—12 is actuated, the latch plate is moved by the cam lobe 3—16 sliding the wall of slot 3—17 away from the lobe ledge 3—23 and permitting the outwardly urging push rod bias to withdraw the start pushrod, opening the motor energizing circuit, and permitting the brake bias 8—26 to apply the brake shoes to the brake drums. Braking action is accompanied by frictional dragging of the take-up reel brake 8—19 together with the slide bar 8—21 against its bias 8—27 to bring the end of the slide bar 8—21 into locking engagement with a notch 8—29 in locking cam 8—28. The reeling reversal therefore remains in locked condition even though the retraction of the start push rod also unlocks the locking cam 8—35. The reeling will accordingly be permitted to decelerate and stop without interference.

After coming to a halt, the slide bar 8—21 is retracted by spring 8—27 unlocking the reeling shift, and reversal can then be effected. Corresponding operation takes place with the reeling direction shifting from forward to rewind, the brake 8—18 and slide bar 8—20 performing the locking operation during deceleration.

According to a further phase of the invention, the construction of Fig. 2 may be modified by arranging for the braking lock to be effected on the shifter form 8—51, as by connecting the fork to the lock cam 8—28. In this form, the reeling shift control knob 8—81 may be operated to shift the position of the control cams 8—75, 8—76 during braking, but the locked shifter fork will not be moved by the shifting springs 8—77, 8—78 until the reeling is halted and braking ceases.

A feature of the form shown in Fig. 2 is that the brake shoes need not be accurately shaped and connected, as in Fig. 1, to so position themselves with respect to the drums during braking operation that disengagement of the brakes by the start push rod is prevented while the reeling is decelerated. Brake disengagement by retraction of the start push rod may be made at any time so that a reeling operation having decelerated, can be immediately accelerated and continued in the same direction without waiting for the reeling to come to a halt. This is a desirable arrangement and avoids many delays, as for example, when a rewinding is inadvertently braked too soon and the high speed of the rewinding causes the braking action to extend over an appreciable period of time.

At the same time, the brakes are so arranged that the braking forces applied are always substantially larger for the reel from which the record track is being unwound than for the other reel, so that deceleration is promptly effected without the "throwing" of the record track by unwinding faster than it is wound on the other reel. The pin and slot connections 8—22, 8—23 as well as the bias springs 8—26, 8—26 cause the brake shoe for the unwinding reel to move along the slot 8—23, bringing the projecting portions of the brake shoe face against the drum. The shoe is accordingly moved outwardly on the pivoted arm 8—25 opposing and increasing the forces applied by the arm biasing spring 8—26, so that the brake shoe is more strongly held against the drum.

When the drum is rotated in the reverse direction for winding up the record track, the brake-holding bias is not increased and relatively higher braking is obtained. This type of differential braking may be provided by suitably shaping the slots 8—23 to limit the lateral displacement of the brake shoe, as shown in Fig. 2. An alternative arrangement includes the suitable shaping of the shoes so that the projecting portions are provided only on the lateral side of the face that is brought against the brake drum when dragged in the unreeling direction. The other side of the face may be level or even recessed, so that when dragged in the reverse direction, braking forces are maintained at a low level or even reduced.

The above constructions provide efficient non-throwing braking action even when the record track is unreeling from a reel full of record track, and having a relatively high rotational inertia and is wound on an almost empty reel of low rotational inertia.

In the form shown in Fig. 2 one locking cam is arranged for interconnection with either of two locking bars each forming part of a separate friction locking assembly. If desired, separate locking cams may be provided for each locking bar and connected in any convenient manner with the reversing shaft 8—80. The indication of the locking connection between cams 8—28 and 8—35 in the figure is only intended to diagrammatically represent one of the possible constructions, that is by prolongation of the shaft 8—80 so that it carries both cams. Separate shafts may also be provided and linked together.

According to a further modification a single friction assembly of the construction of Fig. 2, for example, including only one friction element, such as the brake member 8—19, may be provided with a double acting locking bar for engagement with selector locks to prevent sudden record track reversal. A generally U-shaped laterally slidable lock member may be fitted on the friction element and the ends of the U may be arranged for locking engagement with a part of the reeling direction selector. The selector shaft may carry a cam provided with shoulders and so placed between the ends of the U that either end may be dragged into blocking relation with a cam shoulder by the frictional engagement of the rotating member with the friction element. The cam shoulders may be so arranged that when the reeling direction selector is set in either the forward or rewind position, the shoulder is moved into a position in which it is blocked by the slidable lock dragged by the rotating member moving in the direction corresponding to the selected reeling direction.

The reeling control and selector mechanism need not be divided into two separately manipulated portions, but may be arranged for operation by a single control movement. Thus, one type of unitary control is in the form of a set of rotatably mounted control cams held on a control shaft and operated by a knob fixed to the shaft. By rotation of the knob into selected radial positions, the cams perform the various control operations such as the switching of the motor and amplifier circuits. All the forward reeling selector knob positions may be grouped together distinct from the independently grouped reverse reeling positions. The control shaft is arranged to yieldably urge a relatively rotatable cam member from the forward reeling position, where it establishes the forward drive energizing circuits, to the rearward reeling position where it establishes the rearward drive energizing circuits. A blocking arm forming part of a friction sliding assembly, as shown above, is arranged to block the complete rotation of the yieldably movable cam, but permits an initial rotation sufficient to open the reeling energizing circuits. With this construction the selector controls are readily and simply moved to any desired reeling position, but the reeling energizing cam does not complete its movement unless the record track is not causing the friction element to be frictionally dragged and holds the slidable lock in selector blocking position. When during a forward reeling the selector is moved to a rearward reeling, the reeling energizing cam promptly withdrawn from the forward reeling energization, terminating the supply of forward reeling power, but is kept from establishing the rearward reeling till it is unblocked by the cessation of the reeling movement. The selector control has meanwhile reached the reverse reeling position and continues to urge the reeling energizing to this position. When unblocked the relatively rotatable reeling energization completes its movement and effects reeling reversal.

A similar unitary selector control is alternatively provided with a set of interlinked push rods instead of a rotating knob. The push rods may be arranged so that any one may be moved from an outer non-actuated position to an inner actuated position in which it is automatically latched. At the same time, such inward operation of any rod unlatches any other inwardly held rods so that they are ejected to their outer positions by a suitable bias. This type of construction is the conventional push button arrangement and is shown as forming part of the control assembly in the copending Kornei application, Serial No. 776,523, filed September 27, 1947. In effect it is similar to the interlinked push rods shown in Figs. 1 and 2 above. Resiliently linked reeling energization controls may be arranged for urging movement by the push rods and for blocking by a movable lock forming part of a friction assembly in a manner such as that described above.

According to the invention, the friction elements, such as 8—18 and 8—19 of Fig. 2, may be arranged so that they apply slight or substantially no braking forces to the reeling assembly when frictionally engaged with their cooperating rotating members 8—16, 8—17. Additional brakes may be provided, such as the one-way brakes of the copending Begun application, Serial No. 733,306, filed March 8, 1947. Alternatively, such brakes may be entirely omitted or may be of the electrical type as described in the copending Dank application, Serial No. 690,878, filed August 16, 1946, now Patent No. 2,535,486 of December 26, 1950.

Fig. 3 shows a still further form of magnetic record transducer embodying the invention. This construction is similar to that of Fig. 1, but is so arranged that brake locking action is applied to the energizing circuit for slow forward motor 2—41. A normally closed switch 2—44 is connected in this circuit and so placed that projection of the locking bar 3—41 by the braking drag operates the switch to hold the circuit open until the reeling is halted.

The operation of coupling roller 2—43 may be simplified with this arrangement, as for example, by providing a direct linkage between the control arm 2—47 and the locking cam 3—35. A pin 3—33 fixed on the cam and riding in a slot on the arm is shown as one suitable linkage.

The construction of Fig. 3 functions by locking the reeling reversal control 3—30 during any reeling, as described in connection with Fig. 1, and holding the slow forward reeling motor 2—41 deenergized during braking so that a fast rewinding cannot be suddenly changed to a slow forward reeling. If desired, the shift from slow forward to fast rewind or from fast forward to fast rewind or vice versa may be also safeguarded by connecting the switch 2—44 in the energizing circuits of both motors 2—41, 2—21.

An added feature incorporated in the transducer of Fig. 3 is the arrangement of coupling roller control which makes it possible to operate the stop push rod 3—12 for braking the fast rewinding followed by the rotation of the reeling selector knobs 3—32 to slow forward position RP to increase the braking action. This is accomplished because the initial braking is effected with the coupling roller 2—43 disengaged from the capstan 2—15, while the setting of the controls to slow forward causes the pin 3—33 to move the arm 2—47 into coupling position in which the motor 2—41 becomes coupled with the capstan at a very high coupling ratio. The inertia and friction effects of such added coupling greatly increase the braking action, especially when the operator is anxious to reverse the reeling quickly and performs the reversing control movement before the reeling is halted.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a magnetic record transducing apparatus for transducing magnetic signals on an elongated permanently magnetizable record track; reversible record track guiding and impelling means including a revolvable wheel for moving successive elements of the elongated record track in one direction and for moving said record track in the reverse direction, said guiding and impelling means including two revolvable reels on each of which one end of the record track is held, the track being wound on the reels so that as the track is moved it unwinds from one reel and winds up on the other; said revolvable wheel of the guiding and impelling means arranged to revolve when the record track is in motion; control means including selector elements selectably movable to predetermined different selector positions for selectably reversing the direction of the motion imparted to the track and for reversing the direction of rotation of said revolvable wheel; means mounting said control means in movable contact with a portion of said wheel, said control means including locking elements actuable to be moved from a release position into and held in a locking position by the rotation in one direction of said revolvable wheel and means interlinking said selector elements for cooperation with said locking elements to cause said locking elements in their locking position to lock said selector elements to prevent a reversal of the motion of the track as long as the said rotation of said revolvable wheel holds said locking elements in locking position.

2. A magnetic record transducing apparatus as defined by claim 1 in which the locking elements include at least one friction member connected for frictional engagement with the revolvable wheel when the selector elements are actuated to bring them into position for reversing the record track movement.

3. A magnetic record transducing apparatus as defined by claim 1 in which the locking elements include at least one friction member connected for frictional engagement with the revolvable wheel when the selector elements are actuated to bring them into position for reversing the record track movement; and bias means urging said friction member towards a radial position with respect to the revolvable wheel from which radial position the frictional engagement causes it to be dragged to bring the locking elements into locking position.

4. In a magnetic record transducing apparatus for transducing magnetic signals on an elongated permanently magnetizable record track; record track guiding and impelling means for moving successive elements of the elongated record track in one direction for transducing and in the reverse direction for rewinding, said guiding and impelling means including revolvable wheel structure connected for driving the record track, control elements connected for starting, stopping and reversing the rotation of the revolvable wheel, including brake means and means mounting said brake means for braking engagement with a rotary surface of the revolvable wheel and for motion in a direction perpendicular to the radius of said wheel at said point of engagement, resilient means biasing the brake means toward a given position and in engagement with the revolvable wheel where the rotation of said wheel will drag the brake means away from the given position against said bias during braking engagement; and locking elements interconnected with the control elements and the brake means for preventing the reversal of the revolvable wheel while the brake means is displaced from said given position by the drag of said wheel.

5. In a magnetic record transducing apparatus for transducing magnetic signals on an elongated permanently magnetizable record track; reversible record track guiding and impelling means including a two position coupling roller for moving successive elements of the elongated record track in one direction with said roller in one position and for moving the track in the reverse direction with said roller in the other position, said guiding and impelling means including revolvable wheel structure connected for driving the record track; control means including selector elements selectably movable to predetermined different selector positions for selectably reversing the direction of rotation of the revolvable wheel, said control means also including a friction element and means movably mounting said friction element in frictional engagement with a rotary surface of the revolvable wheel; and locking elements interconnected with the control means, the friction element and said impelling means for movement into locking position by the friction element when engaged by the moving revolvable wheel to lock said coupling roller into said other position, and for locking the selector elements in their reversing position.

6. A magnetic record transducing apparatus as defined by claim 4 in which the brake means includes a braking body having a brake surface with recessed and projecting portions for causing the braking body to be projected a distance further from said rotary surface when the recessed brake surface portion is engaged with said rotary surface and the body is dragged from the biased radial position during a braking action.

7. A magnetic record transducing apparatus as defined by claim 1 in which the revolvable wheel is connected for rotation in opposite directions in accordance with the direction of record track movement; and the locking elements include at least one friction member connected for frictional engagement with the revolvable wheel when the selector elements are actuated to bring them into position for reversing the record track movement; and bias means urging said friction member towards a radial position with respect to the revolvable wheel from which radial position the frictional engagement causes it to be dragged to bring the locking elements into locking position.

8. A magnetic record transducing apparatus as defined by claim 7 in which the locking position of the locking element is on one side of the biased radial position.

9. A magnetic record transducing apparatus as defined by claim 1 in which the control means includes a reversing control movable between forward and reverse reeling positions and an impelling actuator movable between on and off positions; and the reversing control is arranged for locking by the locking elements upon movement of the impelling actuator into the off position.

10. In a magnetic record transducing apparatus for transducing magnetic signals by magnetic flux interlinkage on an elongated permanently magnetizable record track; reversible record track guiding and impelling means including a revolvable wheel for moving successive elements of the elongated record track in one direction and for moving said record track in the reverse direction; said guiding and impelling means including two revolvable reels on each of which one end of the record track is held, the track being wound on the reels so that as the track is moved it unwinds from one reel and winds up on the other; said revolvable wheel of the guiding and impelling means arranged to revolve when the record track is in motion; control means including selector means selectably movable to predetermined different selector positions for selectably reversing the direction of the motion imparted to the track and for reversing the direction of rotation of said revolvable wheel; means mounting said control means in movable contact with a portion of said wheel; said control means also including control elements selectively actuable by the selector means to different positions depending on the direction of the motion to be imparted to the track; said control means further including locking elements actuable to be moved from a release position into and held in a locking position by the rotation of said revolvable wheel; means interlinking said control elements for cooperation with said locking elements to cause said locking elements in their locking position to lock said control elements to prevent a reversal of the direction of motion of the track as long as the rotation of said revolvable wheel holds said locking elements in locking position.

11. A magnetic record transducing apparatus as defined by claim 10 in which the locking elements include at least one friction member connected for frictional engagement with the revolvable wheel when the control elements are actuated to bring them into position for reversing the direction of motion of the record track movement.

12. A magnetic record transducing apparatus as defined by claim 10 in which the locking elements include at least one friction member connected for frictional engagement with the revolvable wheel when the control elements are actuated to bring them into position for reversing the direction of motion of the record track movement; and bias means urging said friction member towards a radial position with respect to the revolvable wheel from which radial position the frictional engagement causes it to be dragged to bring the locking elements into locking position.

13. A magnetic record transducing apparatus as defined by claim 10 in which the revolvable wheel is connected for rotation in opposite directions in accordance with the direction of record track movement; and the locking elements include at least one friction member connected for frictional engagement with the revolvable wheel when the control elements are actuated to bring them into position for reversing the direction of motion of the record track movement; and bias means urging said friction member towards a radial position with respect to the revolvable wheel from which radial position the frictional engagement causes it to be dragged to bring the locking elements into locking position.

ALFRED L. W. WILLIAMS.

REFERENCES CITED

The following references are of record in the file of this patent:

UNITED STATES PATENTS

| Number | Name | Date |
|---|---|---|
| 1,950,692 | Owens | Mar. 13, 1934 |
| 2,106,730 | Foster | Feb. 1, 1938 |
| 2,306,162 | Gipe | Dec. 22, 1942 |
| 2,419,476 | Begun | Apr. 22, 1947 |